(12) United States Patent
Qu et al.

(10) Patent No.: US 9,137,654 B1
(45) Date of Patent: Sep. 15, 2015

(54) DYNAMIC CONSTRUCTION OF APPROVED ACCESS NODE LIST IN PUSH TO TALK NETWORK

(71) Applicant: Sprint Spectrum LP, Overland Park, KS (US)

(72) Inventors: Jing Qu, Sterling, VA (US); Stephanie Teng-Ossman, Vienna, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 112 days.

(21) Appl. No.: 13/938,109

(22) Filed: Jul. 9, 2013

(51) Int. Cl.
*H04W 4/00* (2009.01)
*H04W 8/12* (2009.01)

(52) U.S. Cl.
CPC ...................... *H04W 8/12* (2013.01)

(58) Field of Classification Search
USPC ............... 455/432.1, 436, 550.1, 456.1, 439, 455/435.2
See application file for complete search history.

(56) References Cited

U.S. PATENT DOCUMENTS

| 7,386,311 | B2 * | 6/2008 | Soga et al. ................. 455/432.1 |
| 7,409,202 | B2 | 8/2008 | McClendon |
| 7,702,346 | B2 | 4/2010 | Choksi |
| 8,200,194 | B2 * | 6/2012 | Wang et al. .................. 455/411 |
| 8,867,490 | B1 * | 10/2014 | Krishna et al. ............... 370/331 |
| 8,977,257 | B2 * | 3/2015 | Horn ............................. 455/433 |
| 2002/0009991 | A1 * | 1/2002 | Lu et al. ........................ 455/422 |
| 2005/0197124 | A1 * | 9/2005 | Kang et al. .................... 455/439 |
| 2010/0278165 | A1 * | 11/2010 | Kono ............................. 370/338 |
| 2012/0314562 | A1 * | 12/2012 | Zhao et al. ................... 370/216 |
| 2014/0241333 | A1 * | 8/2014 | Kim et al. ...................... 370/338 |
| 2014/0248871 | A1 * | 9/2014 | Sell et al. .................... 455/432.1 |
| 2014/0328190 | A1 * | 11/2014 | Lord et al. .................... 370/252 |

* cited by examiner

*Primary Examiner* — Babar Sarwar

(57) ABSTRACT

Systems and methods of operating a communication system are provided. A network node of the first network can receive a request from a wireless device associated with the first network to establish a data communication session over a second network through an access node of the second network. A status of the access node of the second network can be determined based on an access node identifier. A location of the wireless device can be determined at the network node of the first network. A network condition of the first network can be determined based on the location of the wireless device. The request to establish the data communication session over the second network can be granted when the network conditions of the first network are less than a threshold and the access node of the second network does not have an approved roaming status.

16 Claims, 7 Drawing Sheets

DYNAMIC CONSTRUCTION OF APPROVED ACCESS NODE LIST IN PUSH TO TALK NETWORK

TECHNICAL BACKGROUND

A wireless device can request authentication to establish communication with a communication network. When the wireless device is authorized, the wireless device can transmit and receive information over the network. Depending on location, the wireless device can communicate over a plurality of networks where each network is associated with a different network operator. For example, the network operator associated with the wireless device (e.g. a primary operator) may not be available in the area where the wireless device is located for various reasons such as network congestion or decreased coverage. In this case, the primary operator can have an agreement with a second operator to allow the wireless device to transmit and receive information using the second operator's network (e.g. "roam").

Communication networks can generally support various types of communications such as interconnect (full-duplex) and push-to-talk (half-duplex) communications as well as a variety of data services. When a wireless device attempts to register on a secondary operator's network using push-to-talk communications, the primary operator's network can authorize such connection when the access node of the secondary operator is included in a pre-approved list (e.g. blacklist or whitelist) of roaming access nodes. If the access node of the secondary operator is not an approved access node, authorization will be denied and the wireless device can experience an undesirable interruption in service.

OVERVIEW

Systems and methods of operating a communication system are provided. A network node of the first network can receive a request from a wireless device associated with the first network to establish a data communication session over a second network through an access node of the second network. The request can comprise an access node identifier. A status of the access node of the second network can be determined based on the access node identifier. The status can be indicative of whether the access node is approved to establish a data communication session with the wireless device. A location of the wireless device can be determined at the network node of the first network. A network condition of the first network can be determined based on the location of the wireless device. The network condition of the first network can be compared to a threshold. The request to establish the data communication session over the second network can be granted when the network conditions of the first network are less than the threshold and the access node of the second network does not have an approved roaming status.

A method of operating a communication system is provided. The method can include determining at a network node of a first network a change in a network condition of the first network. An anticipated network condition can be determined based on the change in the network condition. The anticipated coverage condition of the first network can be compared to a threshold. A status of an access node of a second network can be modified based on the anticipated coverage condition.

DETAILED DESCRIPTION

Figure 1:
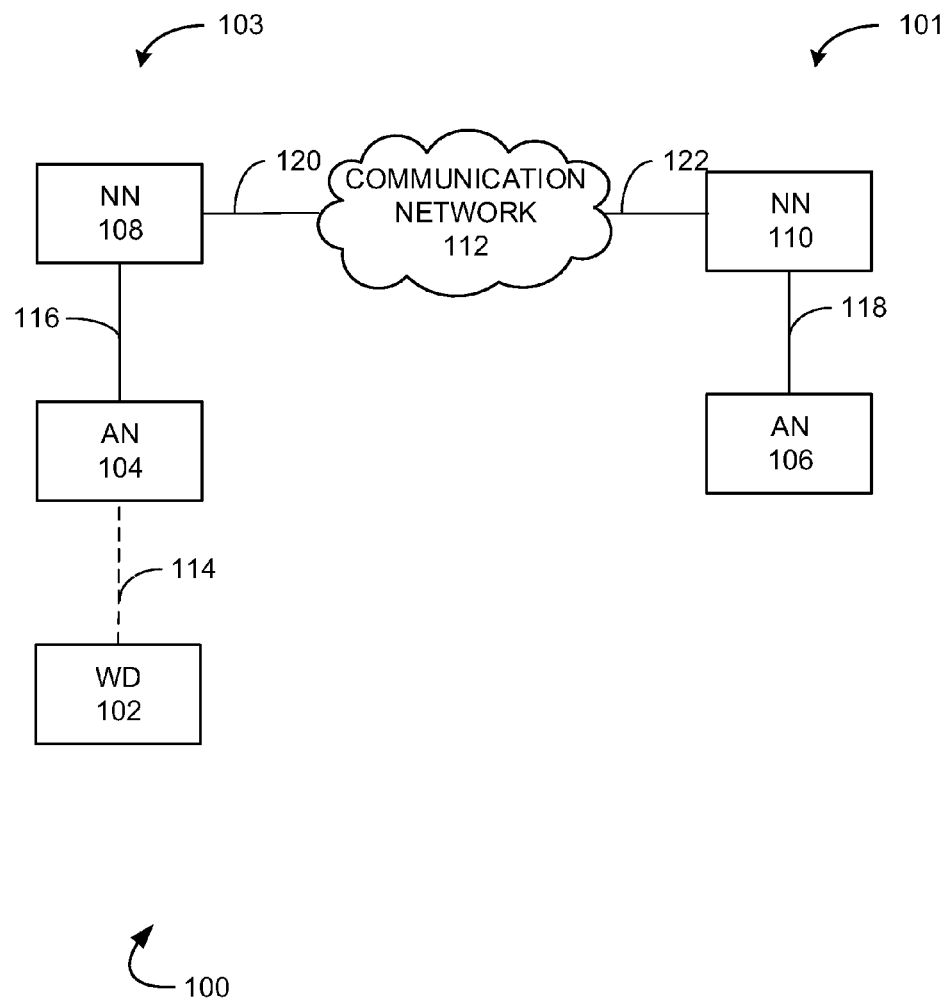
FIG. 1 illustrates an exemplary wireless communication system.

FIG. 1 illustrates an exemplary communication system 100. Communication system 100 can comprise a wireless device 102 associated with a first network operator 101, an access node 104 associated with a second network operator 103, an access node 106 associated with the first network operator 101, a network node 108 associated with the second network operator 103, a network node 110 associated with the first network operator 101, and communication network 112. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication between access nodes 104, 106, network nodes 108, 110 and communication network 112 which are omitted for clarity, including additional processing nodes, routers, gateways, and physical and/or wireless data links for carrying data among the various network elements.

A network operator can be a communications provider that provides access to a network where communications are transmitted over the network. Typically, a network operator owns and operates the nodes within the network. However, a primary network operator can enter into relationships with other network operators to share resources such as frequency bands, network environments, etc. For example, multiple network providers may operate in a multi-operator core network environment, and can enter into agreements to share frequency bands or other network resources. Sharing or roaming agreements may be limited in scope, and network providers can share resources of the network while not sharing other resources of the network. For example, one network provider can share one frequency band with a second network provider while not sharing resources of another frequency band.

Wireless device 102 can be any device configured to communicate over communication system 100 using a wireless interface. For example, wireless device 102 can include a cell phone, a smart phone, a computing platform such as a laptop, palmtop, or a tablet, a personal digital assistant, or an internet access device, and combinations thereof. The wireless device 102 can include transceivers and/or applications capable of communicating using push-to-talk communication.

In an embodiment, the wireless device 102 can further include at least one transceiver associated with a wireless cellular protocol such as code division multiple access (CDMA), global system for mobile communications (GSM), worldwide interoperability for microwave access (WiMAX), long-term evolution (LTE), high-speed downlink packet access (HSDPA), etc. and/or at least one transceiver associated with a local or short-range wireless protocol such as IEEE 802.11, wireless fidelity (WiFi), Bluetooth, Zigbee, infrared data association (IrDA), etc. It is noted that while only one wireless device is illustrated in FIG. 1 as being in communication with access node 104, any number of wireless devices can be implemented.

Wireless device 102 can communicate with access node 104 through communication link 114. Communication link 114 can use various communication media, such as air, space, metal, optical fiber, or some other signal propagation path—including combinations thereof. Communication link 114 can comprise many different signals sharing the same link.

Access node 104 can be any network node associated with the second network operator 103 and can be configured to communicate with wireless device 102. Access node 106 can be any network node associated with the first network operator 101 and can be configured to communicate with wireless device 102. Access nodes 104, 106 can be capable of providing wireless communications to wireless device 102 from communication network 112. For example, access nodes 104, 106 can be selected from a base transceiver station, a radio base station, an eNodeB device, or an enhanced eNodeB device.

Network nodes 108, 110 can be any network node that permits wireless device 102 to register with a network operator 101, 103. In a dispatch communication system, network nodes 108, 110 can determine whether wireless device has authorization to communicate over the network operator's network, whether the wireless device can communicate over the network operator's network using the associated access node, and/or whether the wireless device has authorization to communicate using push-to-talk communications over the network operator's network using the associated access node. The network node 108, 110 can be a single device having various functions or a plurality of devices having different functions. For example, network node 108, 110 can include at least one of an authentication, authorization, and accounting (AAA) node, a resource management server (RMS), a subscriber profile system (SPS), a policy server, and a Qchat AAA.

Access nodes 104, 106 and/or network nodes 108, 110 can comprise a processor and associated circuitry to execute or direct the execution of computer-readable instructions to obtain information. Access nodes 104, 106 and/or network nodes 108, 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 104, 106 and/or network nodes 108, 110 can receive instructions and other input at a user interface.

Network nodes 108, 110 can be in communication with access nodes 104, 106 through communication links 116, 118. Network nodes 108, 110 can also be in communication with communication network 112 through communication links 120, 122. Communication links 116, 118, 120, 122 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 116, 118, 120, 122 can be a direct link or might include various equipment, intermediate components, systems, and networks.

Communication network 112 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 112 can be capable of carrying data, for example, to support voice, push-to-talk, and data communications by a wireless device such as wireless device 102. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 112 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 112 can also comprise additional base stations, controller nodes, telephony switches, internet routers, network gateways, computer systems, communication links, or some other type of communication equipment, and combinations thereof.

In operation, wireless device 102 of first network operator 101 can establish a communication link 114 with access node 104 associated with the second network operator 103. Wireless device 102 can request authorization to establish a push-to-talk (PTT) communication session over the second network operator 103. Network node 108 can communicate the authorization request to the network node 110 over communication network 112. Based on the location of the wireless device 102 and the network conditions and coverage of the first network operator and the second network operator at the wireless device 102 location, network node 110 can determine whether to dynamically modify a list of authorized access nodes maintained at the network node 110. The network node 110 can further grant or deny the authorization request from the wireless device 102 to establish a PTT communication session over the network of the second network operator 103 based on the list of authorized access nodes maintained at the network node 110.

Figure 2:
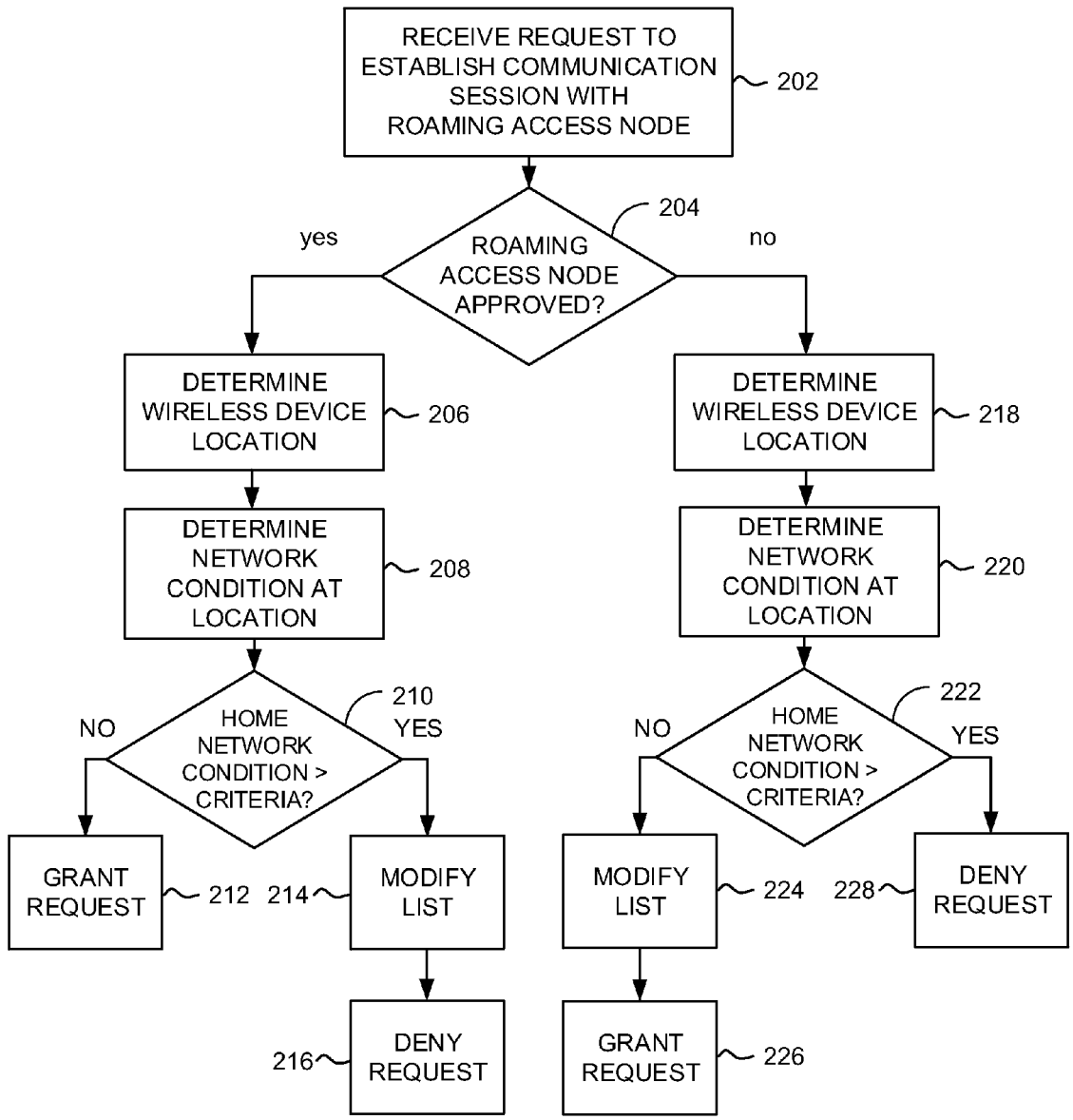
FIG. 2 illustrates an exemplary method of communicating with a wireless device in a wireless communication system.

FIG. 2 illustrates a flow chart of an exemplary method for establishing a push-to-talk (PTT) communication session with a wireless device. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

A wireless device associated with a first network (e.g. the home network of the wireless device) can connect to a second network (e.g. a roaming network of the wireless device) over a communication link with an access node associated with a roaming network. The wireless device can send a request to establish a PTT communication session over the roaming network. A network node of the home network can receive the request to establish a PTT communication session over a roaming network at 202. For example, a network node 108 associated with the roaming network can receive an authorization request to establish a PTT communication session over the roaming network from the wireless device 102 and send the authorization request to the network node 110 of the home network.

A home network can have a preference for whether the wireless device establishes a PTT communication session using home network or a roaming network. This preference can be based on numerous factors. For example, the network conditions of the home network or the roaming network may not provide adequate coverage at the location of the wireless device. The network capacity could be constrained by network congestion caused by various factors such as the number of users in the area, the types of applications requested by each user such as voice, data, and PTT communications, network outages, etc. Alternatively or in addition to network constraints, access node coverage of the home network or the roaming network can be compromised due to several other factors such as environmental conditions such as time of day, weather, season, etc.

A management list can be maintained to reflect which network is preferred to establish a PTT communication session. The management list can be used to determine whether the wireless device has authorization to connect over the roaming network. The management list can be indicative of access nodes from both the home network and any roaming network in which the wireless device can establish a PTT communication session. For example, the management list can be a list of all access nodes approved for communications or the management list can be a list of all access nodes not approved for communications.

At 204, the home network can determine whether the roaming access node in which the wireless device has established a communication link is an approved access node to initiate a PTT communication session. For example, network node 110 can determine whether access node 104 is an approved access node to initiate a PTT communication session based on the list stored at the network node 110.

When the access node of the roaming network is an approved access node, the location of the wireless device can be determined at 206. The location of the wireless device can be determined by the wireless device, the roaming network, and/or the home network in various ways. For example, one or more of the following methods can be used such as round-trip delay time, triangulation, signals received from a global position system (GPS), etc. After the location of the wireless device is determined, the location information can be transmitted to the home network.

At 208, at least one network condition can be determined based on the wireless device location. For example, the network capacity and coverage of access nodes of the home network and the roaming network within a predetermined area of the location of wireless device 102 can be determined at and/or communicated to network node 110. Network capacity and network coverage of each access node can be determined in various ways. For example, network capacity can be based on network congestion, number of users, type of applications, and/or amount of information transmitted and received. Network capacity can be determined using various methods such as monitoring data transmissions, quality of service indicators, etc. Network coverage of each access node can be based on various communication link characteristics and can be determined using various factors such as received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR). In addition, environmental factors that can influence access node signal coverage can also be considered such as time of day, weather, season, etc.

At least one network condition of the home network can be compared to a threshold at 210 to determine whether the list indicative of approved access nodes should be modified. The threshold can be a single value or a range of values and can reflect various factors such as which network would provide a user a higher quality experience, which network would provide the least amount of undesirable interruptions in service, and/or which network would minimize expenditures for network use. For example, the threshold can be a predetermined value or range of values, or the threshold can be dynamically determined based on network capacity and/or coverage values of the home network and/or roaming network.

When the at least one home network condition is less than the threshold, the home network can grant the request at 212 and authorize the wireless device to initiate a PTT communication session over the roaming network. For example, network node 110 can grant the authorization request and wireless device 102 can initiate a PTT communication session over the second network 103 via access node 104.

When the at least one home network condition is greater than the threshold, the home network can modify the list of approved access nodes at 214 and deny the request at 216 for authorization to establish a PTT communication session over the roaming network. For example, network node 110 can modify the list of approved network nodes to reflect that access node 104 is no longer an approved access node. Network node 110 can then send a response to the authorization request to the wireless device 102 via network node 108. In an embodiment, network node 110 can further transmit a message to wireless device 102 via network node 108 indicating an alternative access node (e.g. another access node of the roaming network or an access node of the home network) with which the wireless device 102 should establish a communication link and initiate a PTT communication session.

If the roaming access node is not an approved access node, the home network can determine the wireless device location at 218 and determine at least one network condition of the home and roaming networks at 220. Determinations of wireless device location, network capacity and/or coverage of the home and roaming networks can be performed similarly as previously described. The at least one network condition of the home network can be compared to a threshold at 222.

When the at least one home network condition is less than the threshold, the home network can modify the list indicative of approved access nodes at 224 and grant the request at 226 of the wireless device to establish a PTT communication session over the roaming network. For example, network node 110 can modify the list to reflect that access node 104 is now an approved access node. Network node 110 can send a message granting the authorization request of the wireless device to initiate a PTT communication session over the second network 103 via network node 108.

When the at least one home network condition is greater than the threshold, the home network can deny the request to initiate a PTT communication session over the roaming network. For example, network node 110 can send a message denying the authorization request to wireless device 102 via network node 108. In an embodiment, network node 110 can send a message to wireless device 102 indicating an access node of the home network with which the wireless device 102 should establish a communication link and initiate a PTT communication session.

Figure 3:
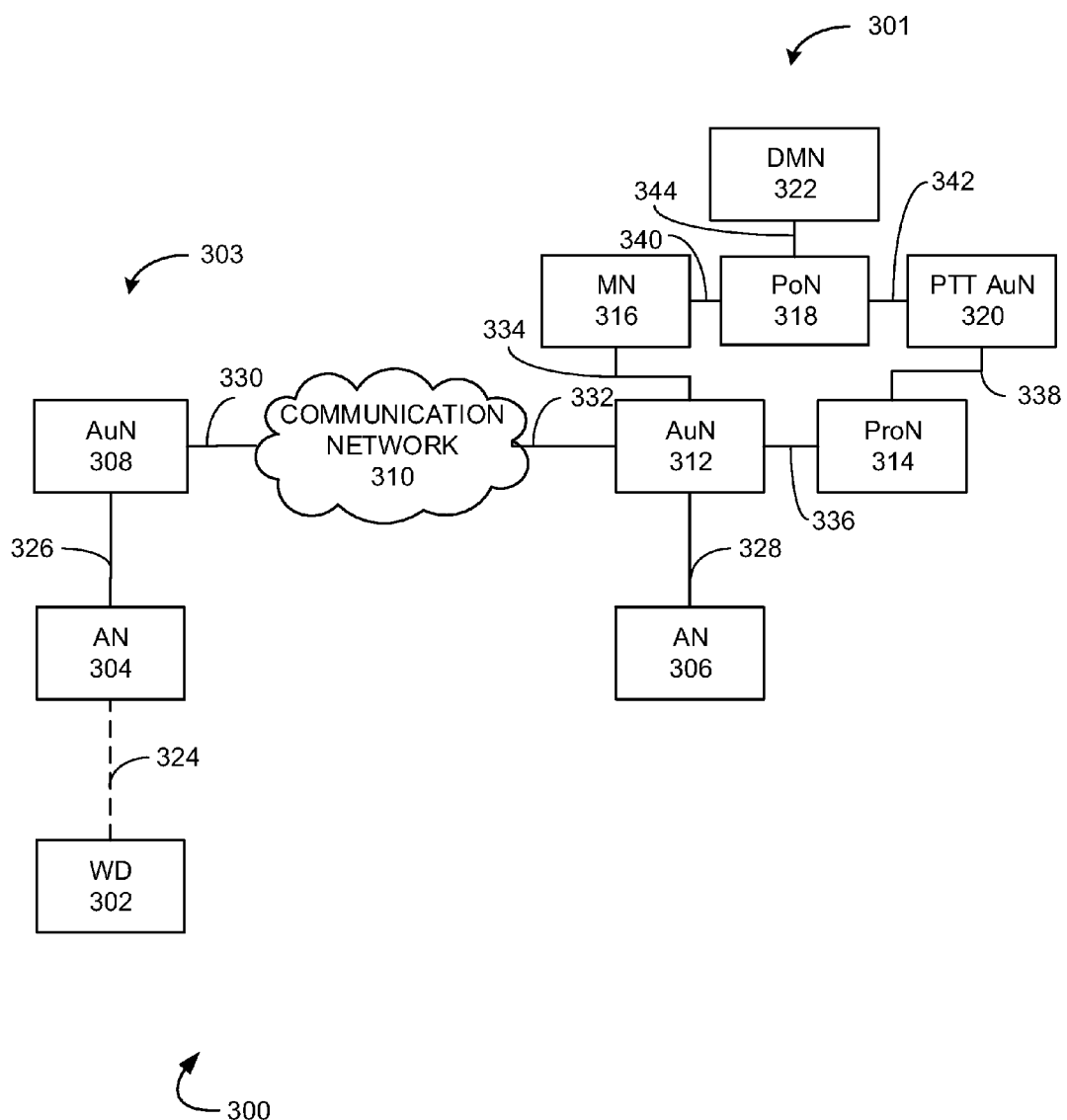
FIG. 3 illustrates another exemplary wireless communication system.

FIG. 3 is an exemplary communication system 300 for establishing a push-to-talk (PTT) communication session from a wireless device. Communication system 300 can comprise a wireless device 302 associated with a first network operator 301, an access node 304 associated with a second network operator 303, an access node 306 associated with the first network operator, an authentication node 308 of the second network operator 303, a communication network 310, an authentication node 312 of the first network operator 301, a provisioning node 314, a management node 316, a policy node 318, PTT authentication node 320, and a dynamic management node 322. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication between access nodes 304, 306, authentication nodes 308, 312 and communication network 310 which are omitted for clarity, including additional processing nodes, routers, gateways, and physical and/or wireless data links for carrying data among the various network elements.

A network operator can be a communications provider that provides access to a network where communications are transmitted over the network. Typically, a network operator owns and operates the nodes within the network. However, a primary network operator can enter into relationships with other network operators to share resources such as frequency bands, network environments, etc. For example, multiple network providers may operate in a multi-operator core network environment, and can enter into agreements to share frequency bands or other network resources. Sharing or roaming agreements may be limited in scope, and network providers can share resources of the network while not sharing other resources of the network. For example, one network provider can share one frequency band with a second network provider while not sharing resources of another frequency band.

Wireless device 302 can be any device configured to communicate over communication system 300 using a wireless interface. For example, wireless device 302 can include a cell phone, a smart phone, a computing platform such as a laptop, palmtop, or a tablet, a personal digital assistant, or an internet access device, and combinations thereof. The wireless device 302 can include transceivers and/or applications capable of communicating using push-to-talk communication.

In an embodiment, the wireless device 302 can further include at least one transceiver associated with a wireless cellular protocol such as code division multiple access (CDMA), global system for mobile communications (GSM), worldwide interoperability for microwave access (WiMAX), long-term evolution (LTE), high-speed downlink packet access (HSDPA), etc. and/or at least one transceiver associated with a local or short-range wireless protocol such as IEEE 802.11, wireless fidelity (WiFi), Bluetooth, Zigbee, infrared data association (IrDA), etc. It is noted that while only one wireless device is illustrated in FIG. 3 as being in communication with access node 304, any number of wireless devices can be implemented.

Wireless device 302 can communicate with access node 304 through communication link 324. Communication link 324 can use various communication media, such as air, space, metal, optical fiber, or some other signal propagation path—including combinations thereof. Communication link 324 can comprise many different signals sharing the same link.

Access node 304 can be any network node associated with the second network operator 303 and can be configured to communicate with wireless device 302. Access node 306 can be any network node associated with the first network operator 301 and can be configured to communicate with wireless device 302. Access nodes 304, 306 can be capable of providing wireless communications to wireless device 302 from communication network 310. For example, access nodes 304, 306 can be selected from a base transceiver station, a radio base station, an eNodeB device, or an enhanced eNodeB device.

Authorization nodes 308, 312 can manage the authorization of wireless device 302 over the first network 301 or second network 303, respectively. Authorization nodes 308, 312 can further authorize services available to the wireless device 302 and/or perform accounting related to use of services over the first or second network 301, 303 such as network application services and roaming services. The authorization nodes 308, 312 can be any network node capable of authorization such as an authentication, authorization, and accounting (AAA) node.

Authorization nodes 308, 312 can be in communication with access nodes 304, 306 through communication links 326, 328. Authorization nodes 308, 312 can also be in communication with communication network 310 through communication links 330, 332.

Communication network 310 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 310 can be capable of carrying data, for example, to support voice, push-to-talk, and data communications by a wireless device such as wireless device 302. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 310 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 310 can also comprise additional base stations, controller nodes, telephony switches, internet routers, network gateways, computer systems, communication links, or some other type of communication equipment, and combinations thereof.

Provisioning node 314 can be configured to manage network services and/or access permissions which can be provisioned for network subscribers associated with network 301. For example, provisioning node 314 can be a subscriber provisioning system. Provisioning node 314 can be in communication with authorization node 312 through communication link 336.

Management node 316 can be configured to protect information from unauthorized network access. For example, management node 316 can grant or deny network rights to a subscriber based on the subscriber's authorization. Management node 316 can protect the information in various ways such as encryption. Management node 316 can be a rights management server. Management node 316 can be in communication with authentication node 312 through communication link 334.

Policy node 318 can be configured to communicate between authorization node 312 and PTT authentication node 320. Policy node 318 can further determine whether an access node 304 in which the wireless device 302 is in communication with is an approved access node. When the access node is included in a list indicative of an approved access node, policy node 318 can send a message granting authorization to initiate a PTT communication session. When the access node 304 is not included in the list, the policy node 318 can determine whether to modify the list indicative of approved access nodes. Policy node 318 can be a policy server working as a radius proxy to intercept PTT registration messages. The policy node 318 can perform an analysis to determine whether to allow or block PTT service.

In an embodiment, the policy node 318 can perform analysis to determine whether to allow or block PTT service when the PTT user is roaming outside of a home network. The policy node 318 can dynamically construct a PTT roaming services list of approved access nodes to respond to real-time changes in network conditions and capacities of a home network and/or a roaming network. The policy node 318 can provide an adaptive blocking and/or unblocking experience. Policy node 318 can be in communication with authentication node 312 via management node 316 through communication link 340 and PTT authentication node 320 through communication link 342.

In an embodiment, policy node 318 can determine whether to modify the list indicative of approved access nodes based on the location of a subscriber and determine whether home network coverage conditions are available in the area of the subscriber. When a network condition such as network coverage and/or network conditions of the home network are greater than a threshold, the policy node 318 can modify the list of approved access nodes. Determinations of wireless device location, network capacity and/or coverage of the home and roaming networks can be made by the policy node 318 and performed similarly as previously described. When coverage and/or network conditions of the home network are less than a threshold, the policy node 318 can grant the request to establish the PTT communication session over the roaming network to the wireless device 302.

PTT authentication node 320 can be configured to authenticate wireless device 302 to establish a PTT communication session. PTT authentication node 320 can be any network node capable of authorization of a PTT communication session such as Qchat authentication, authorization, and accounting (AAA) node. The PTT authentication node 320 can be in communication with policy node 318 through communication link 342 and provisioning node 314 through communication link 338.

Dynamic management node 322 can be configured to maintain a list indicative of access nodes of the first network 301 and/or second network 303 approved for wireless device 302 to establish a PTT communication session. Dynamic management node 322 can be a separate device or it can be integrated into at least one other node of the first network 301 such as the policy node 318. Dynamic management node 322 can be in communication with policy node 318 through communication link 344.

Communication links 326, 328, 330, 332, 334, 336, 338, 340, 342, 344 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 326, 328, 330, 332, 334, 336, 338, 340, 342, 344 can be a direct link or might include various equipment, intermediate components, systems, and networks.

Access nodes 304, 306, authentication nodes 308, 312, communication network 310, provisioning node 314, management node 316, policy node 318, PTT authentication node 320, and/or dynamic management node 322 can comprise a processor and associated circuitry to execute or direct the execution of computer-readable instructions to obtain information. Access nodes 304, 306, authentication nodes 308, 312, communication network 310, provisioning node 314, management node 316, policy node 318, PTT authentication node 320, and/or dynamic management node 322 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 304, 306, authentication nodes 308, 312, communication network 310, provisioning node 314, management node 316, policy node 318, PTT authentication node 320, and/or dynamic management node 322 can receive instructions and other input at a user interface.

In an embodiment, wireless device 302 can establish a communication link 324 with a packet data serving node (PDSN). For example wireless device 302 can register with access node 304 over the second network 303. After the wireless device 302 establishes a communication link 324 with access node 304, an accounting message can be generated at authentication node 308 of the second network where the accounting message can be transmitted to authentication node 312 through communication network 310.

The accounting message can be used to determine network usage by the wireless device. For example, the accounting message can be an Accounting Start message used by a RADIUS protocol to determine which network the wireless device is communicating data over and the amount of data usage associated with the wireless device. It can signal the start of a user's network access. An accounting message can be used in determining billing information for the wireless device. Network congestion and capacity determinations can also be based on the accounting message.

The accounting message can include identification information such as user identification, a network address, a point of attachment, a unique session identifier, etc. For example, the accounting message can include a network access identifier, a Qchat user ID, a BSID, a carrier-ID, a technology attribute. The accounting message can further include location information for wireless device 302.

Authentication node 312 can determine user identification of the wireless device. For example, authentication node 312 can include a plug-in that can resolve the network access identifier to the Qchat user ID through the provisioning node

314. The authentication node 312 can filter out the Qchat user's accounting message and forward the accounting message to management node 316.

The management node 316 can store the accounting message in memory where the accounting message includes Qchat-ID, BSID, Carrier-ID, and technology attribute. The accounting message can be indexed in the management node 316 by the Qchat-ID.

Wireless device 302 can transmit a Qchat registration message where the Qchat registration message can trigger a Radius request at the policy node 318. The policy node 318 can proxy or approve the accounting message from the authorization node 312 and forward the accounting message to the PTT authorization node 320 for authentication.

The PTT authorization node 320 can authenticate the registration through the provisioning node 314. The PTT authorization node 320 can further return the authentication result to the provisioning node 314 and the provisioning node 314 can query the management node 316 to resolve Qchat-ID to BSID and to verify if the BSID is within the list indicative of approved access nodes.

When the BSID is indicative of an approved access node, the policy node 318 can determine the wireless device 302 location and a network condition such as the network coverage and/or capacity of access nodes of the home network and/or the roaming network within a predetermined area of the wireless device location. The policy node 318 can send an access grant message to the wireless device 302 when the home network capacity and/or coverage is less than a threshold to grant the Qchat registration and a PTT communication session can be initiated. The policy node 318 can modify the list indicative of approved access nodes to designate that the access node is no longer an approved access node when the home network capacity and coverage is greater than a threshold. The policy node 318 can send an access deny message to the wireless device 302 denying PTT coverage to the wireless device 302 over the roaming network with the associated access node. However, the policy node 318 can further indicate alternative access nodes that are approved access nodes either on the home network or the roaming network in which the wireless device 302 can initiate a PTT communication session.

When the BSID is indicative of a non-approved access node, the policy node 318 can determine the location of wireless device 302 and the network coverage and/or capacity of access nodes of the home network and/or the roaming network within a predetermined area of the wireless device location. The policy node 318 can send an access deny message to the wireless device 302 when the home network capacity and/or coverage is greater than a threshold denying PTT coverage to the wireless device 302 over the roaming network with the associated access node. However, the policy node 318 can further indicate alternative access nodes that are approved access nodes either on the home network or the roaming network in which the wireless device 302 can initiate a PTT communication session. The policy node 318 can modify the list indicative of approved access nodes to designate that the access node is now an approved access node when the home network capacity and coverage is less than a threshold. The policy node 318 can send an access grant message to the wireless device 302 to grant the Qchat registration and a PTT communication session can be initiated.

Figure 4:
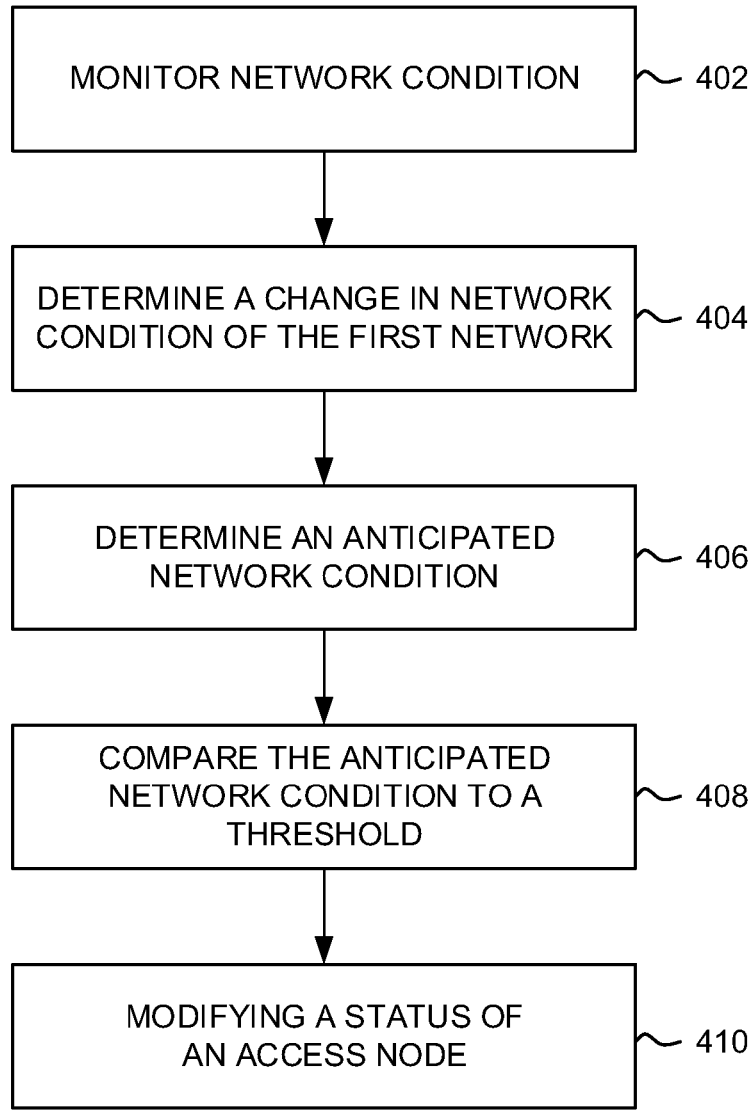
FIG. 4 illustrates another exemplary wireless communication system.

FIG. 4 illustrates a flow chart of an exemplary method of operating a wireless communication system according to an alternative embodiment of the present disclosure. The method will be discussed with reference to exemplary communication system 300 illustrated in FIG. 3. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

In an embodiment, a communication system can proactively address anticipated network coverage gaps and/or network capacity issues by dynamically modifying a list indicative of approved access nodes of a home network and/or a roaming network in real-time. The list indicative of approved access nodes can be modified based on at least one network condition of the home network and/or the roaming network.

A home network node can monitor the status of network conditions for a home network and/or a roaming network at 402. Various network conditions can be monitored. For example, policy node 318 can monitor network capacity based on network congestion, throughput, number of users, type of applications, and/or amount of information transmitted and received. Network capacity can be determined using various methods such as monitoring data transmissions, quality of service indicators, etc. Measurements can be based on the rate at which data is transmitted such as bits per second, data packets per second, and/or data packets per time slot. The data can be measured through the entire network and/or a predetermined area of the network.

Network coverage of each access node can be based on various communication link characteristics and can be determined using various factors such as received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR). In addition, environmental factors that can influence access node signal coverage can also be considered such as time of day, weather, season, etc.

At 404, the home network can determine a change in at least one network condition. For example, the policy node 318 can monitor the status of network capacity and/or network coverage of a home network and/or a roaming network. The home network can then determine a change in network capacity and/or network coverage of a home network and/or a roaming network without any initiation from a wireless device.

For example, the home network can compare the at least one monitored network condition with a predetermined threshold. A change in the at least one network capacity and/or network coverage can be determined with the at least one network condition does not meet the predetermined threshold. For instance, a change in a network condition can be determined if the RF conditions of an access node drop below a predetermined threshold. Alternatively, a change in a network can be determined if network capacity within a predefined area exceeds a predetermined threshold. The predetermined threshold can be a single value or a range of values and can be static or dynamically determined.

In an embodiment, a change in network congestion can be detected when a surge of unanticipated traffic is detected, access nodes become overloaded, or substantial collisions occur. For example, a cell tower can go down reducing the number of access nodes within an area. Alternatively, a high number of users can congregate in an area that normally does not handle the high number of user traffic such as for an event including football game, a concert, an accident, etc.

Changes in a network condition can affect an anticipated network condition for the communication system. For example, if the network capacity is reduced due to hardware outages or a significant increase in network capacity within a predetermined area, overall network capacity can be affected. In 406, the home network can determine at least one anticipated network condition. An anticipated network condition can be based on a predicted network capacity and/or coverage after a change in a network condition is determined. The anticipated network condition can be based on various factors such as location within the network, throughput of the network at the predetermined location and other locations within the network, etc.

The at least one anticipated network condition can be compared to a threshold in 408. For example, policy server 318 can compare the at least one network condition to a predetermined value or range of values that are static or dynamically determined. The threshold can be based on the network condition detected by the network or the determined change detected in the network condition.

When the anticipated network condition does not meet the threshold, a status of an access node can be modified in a management list of approved access node at 410. For example, policy server 318 can modify the management list stored in dynamic management node 322. In an embodiment, the access node can be associated with the home network or the roaming network. The status of the access node can be modified from an approved status to a non-approved status or from a non-approved status to an approved status.

Figure 5:
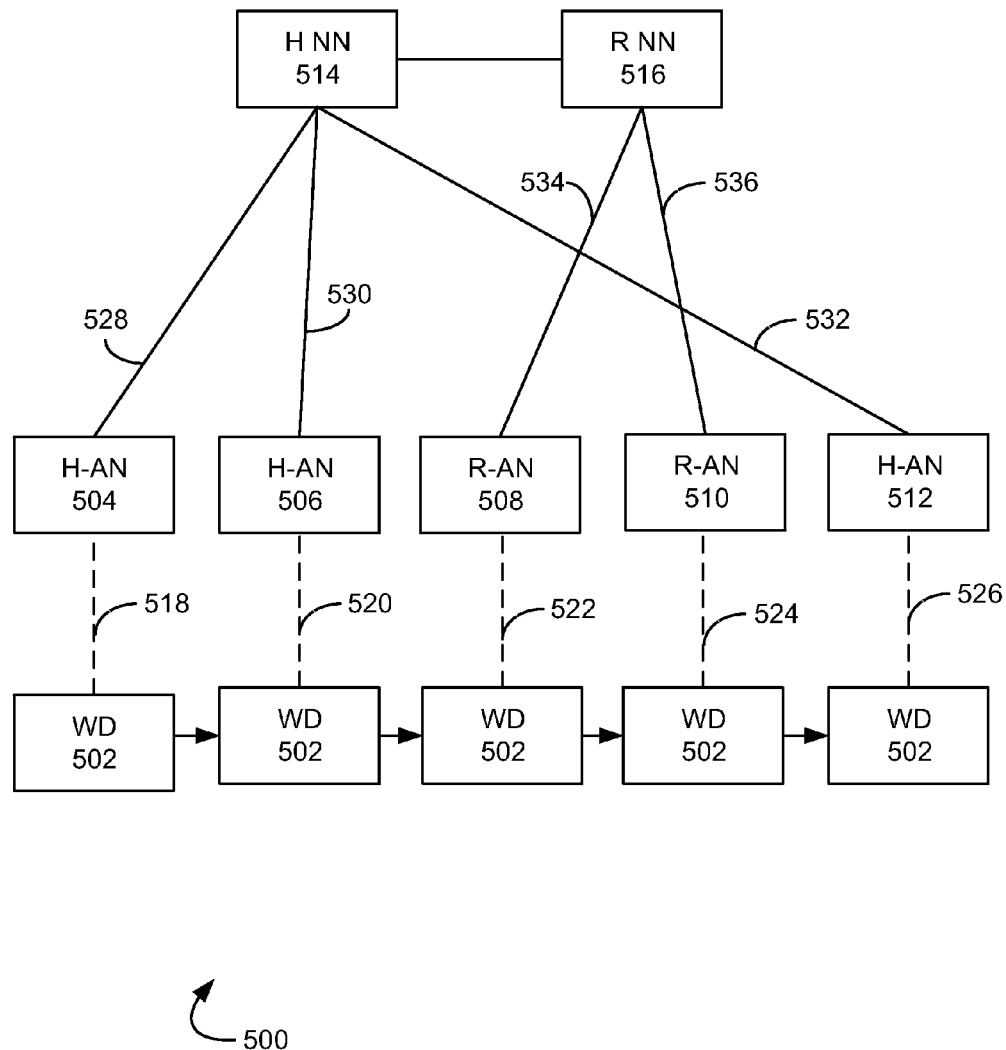
FIG. 5 illustrates an exemplary method of monitoring wireless network conditions.

FIG. 5 is an exemplary communication system 500 for establishing a push-to-talk (PTT) communication session from a wireless device according to another embodiment of the present disclosure. Communication system 500 can comprise a wireless device 502, a first access node 504 associated with a home network, a second access node 506 associated with a home network, a first access node 508 associated with a roaming network, a second access node 510 associated with a roaming network, a third access node 512 associated with a roaming network, a network node 514 associated with the home network, and a network node 516 associated with the roaming network. Other network elements may be present in the communication system 500 to facilitate communication but are omitted for clarity, such as base stations, base station controllers, gateways, mobile switching centers, dispatch application processors, and location registers such as a home location register or visitor location register. Furthermore, other network elements may be present to facilitate communication between access nodes 504, 506, 508, 510, 512 and network nodes 514, 516 which are omitted for clarity, including additional processing nodes, routers, gateways, and physical and/or wireless data links for carrying data among the various network elements.

A network operator can be a communications provider that provides access to a network where communications are transmitted over the network. Typically, a network operator owns and operates the nodes within the network. However, a primary or home network operator can enter into relationships with roaming network operators to share resources such as frequency bands, network environments, etc. For example, multiple network providers may operate in a multi-operator core network environment, and can enter into agreements to share frequency bands or other network resources. Sharing or roaming agreements may be limited in scope, and network providers can share resources of the network while not sharing other resources of the network. For example, one network provider can share one frequency band with a second network provider while not sharing resources of another frequency band.

Wireless device 502 can be any device configured to communicate over communication system 500 using a wireless interface. For example, wireless device 502 can include a cell phone, a smart phone, a computing platform such as a laptop, palmtop, or a tablet, a personal digital assistant, or an internet access device, and combinations thereof. The wireless device 502 can include transceivers and/or applications capable of communicating using push-to-talk (PTT) communication.

In an embodiment, the wireless device 502 can further include at least one transceiver associated with a wireless cellular protocol such as code division multiple access (CDMA), global system for mobile communications (GSM), worldwide interoperability for microwave access (WiMAX), long-term evolution (LTE), high-speed downlink packet access (HSDPA), etc. and/or at least one transceiver associated with a local or short-range wireless protocol such as IEEE 802.11, wireless fidelity (WiFi), Bluetooth, Zigbee, infrared data association (IrDA), etc. It is noted that while only one wireless device is illustrated in FIG. 4 as being in communication with access nodes 504, 506, 508, 510, 512 any number of wireless devices can be implemented.

In an embodiment, communication system 500 can proactively address network coverage gaps and/or anticipated network capacity issues by dynamically modifying a list indicative of approved access nodes of a home network and/or a roaming network in real-time. The list indicative of approved access nodes can be modified based on a currently location and/or a predicted location of a wireless device.

As illustrated in FIG. 5, as the location of the wireless device 502 changes, handovers can occur to maintain the active PTT communication session. The handovers can be between access nodes of the same network or between two different networks. For example, if a user is traveling along a highway, wireless device 502 can initiate a PTT communication session over the home network via access node 504. An accounting message such as Accounting Start message can be sent to a home network node 514. When the location of the wireless device changes, a handover occurs to access node 506. Since access node 506 is within the same network as the access node in which the wireless device 502 is coming from, an accounting message such as Accounting Interim can be sent to the home network node 514 upon handover. As the wireless device 502 continues to travel, a handover to access node 508 can occur. Access node 508 can be associated with a roaming network. An accounting message such as Accounting Start can be sent to home network node 514 via the roaming network node 516. When a handover occurs to access node 510, an accounting message such as Accounting Interim can be sent to the home network node 514 via the roaming network node 516. A handover between access node 510 and access node 512 can occur and an accounting message such as an Accounting Start message can be sent to the home network node 514.

Wireless device 502 can communicate with access node 504 through communication link 518, with access node 506 through communication link 520, with access node 508 through communication link 522, with access node 510 through communication link 524, and with access node 512 through communication link 526. Communication links 518, 520, 522, 524, 526 can use various communication media, such as air, space, metal, optical fiber, or some other signal propagation path—including combinations thereof. Communication links 518, 520, 522, 524, 526 can comprise many different signals sharing the same link.

Home network node 514 can be in communication with access node 504 through communication link 528, with access node 506 through communication link 530, and with access node 512 through communication link 532. Roaming network node 516 can be in communication with access node 508 through communication link 534, with access node 510 through communication link 536, and with home network node 514 through communication link 538.

Communication links 528, 530, 532, 534, 536, 538 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 528, 530, 532, 534, 536, 538 can be a direct link or might include various equipment, intermediate components, systems, and networks.

In operation, the accounting messages can be used to determine network usage by the wireless device. For example, the Accounting Start message and the Accounting Interim message can be used by a RADIUS protocol to determine which network the wireless device is communicating data over and the amount of data usage associated with the wireless device. It can signal the start of a user's network access. An accounting message can be used in determining billing information for the wireless device.

The accounting message can include identification information such as user identification, a network address, a point of attachment, a unique session identifier, etc. For example, the accounting message can include a network access identifier, a Qchat user ID, a BSID, a carrier-ID, a technology attribute. The accounting message can further include location information for wireless device 502.

The accounting messages can be further used to modify a list indicative of approved access nodes based on a predicted future wireless device location. For example, a network node 514 can determine a predicted location of the wireless device based on a determined direction and speed at which the wireless device is moving. When the first accounting message is sent to the home network node 514 indicating that a PTT communication session is initiated, the network node 514 of the home network can extract information to determine the direction and speed of the wireless device.

In an embodiment, direction and speed can be determined based on handoff intervals between access nodes. Handoff intervals are not uniform for all wireless devices. For example, the RF sensitivity of each device can be based on the individual manufacture specification rather than an industry standard. Therefore, in order to predict a future wireless device location, device model information of the wireless device 502 and data session handoff intervals can be used to determine direction and speed. The device model information can be resolved through the network access identifier included in the accounting message and stored at a network node such as a provisioning network node. Data session handoff interval between access nodes can be determined based on each accounting message received from wireless device 502 as it moves from access node 504 to 506 to 508 to 510 to 512.

Any number of data session handoff intervals greater than two can be used to determine a predicted location and speed of the wireless device 502.

Home network node 514 can monitor the accounting messages to predict the future location of the wireless device 502. In addition, the home network node 514 can monitor the accounting messages to determine whether a change in network capacity and/or coverage can be anticipated. For example, when a user is traveling along a highway, the speed of the wireless device 502 can be relatively predictable. However, if an event occurs that would cause the speed of the wireless device 502 to change such as an accident or traffic congestion, the number of handovers between access nodes can be reduced because the wireless device remains within a current coverage area for extended periods of time. In addition, the network services such as interconnect communication, PTT, and data communication can increase, limiting network access to services.

The home network node 514 can monitor the network to determine the occurrence of such situations and project potential capacity changes of home network access nodes and roaming network access nodes. A list indicative of approved access nodes can be modified based on the projected capacity changes.

For example, even if the coverage of home network access nodes maintain a good RF conditions in the area, it is more likely that wireless device 502 will be handed over to a roaming access node due network capacity changes because of an increase in network usage from other users within the coverage area. When this occurs, the home network node 514 can proactively approve previously non-approved access nodes of the roaming network within the home network coverage area.

In addition to current wireless device location, predicted wireless device location, home network coverage and capacity, and roaming network coverage and capacity, the list indicative of approved access nodes can also be modified based on the capacity of each access node. For example, the number of 1X and DO communication links established with an access node can be used to determine the number of EVDO sessions and the capacity of available bandwidth for the access node. The higher the available capacity of the access node, the greater the likelihood the access node can be an approved access node. In addition, an access node can be approved based on the type of communication link established for the PTT communication session. The PTT communication session can be established over both 1X and DO links, however DO is preferred due to the significant latency and delay introduced over 1X networks. When an access node has available capacity to establish a PTT communication session over the DO network then the access node can be approved. Moreover, the capacity of the access node in relation to the home or roaming network can further be considered. The approval of an access node can be based on the preference to stay within the home network rather than transfer to a roaming network. For example, an access node can be approved when the access node associated with home network has available capacity to establish a PTT communication session over the DO network.

Figure 6:
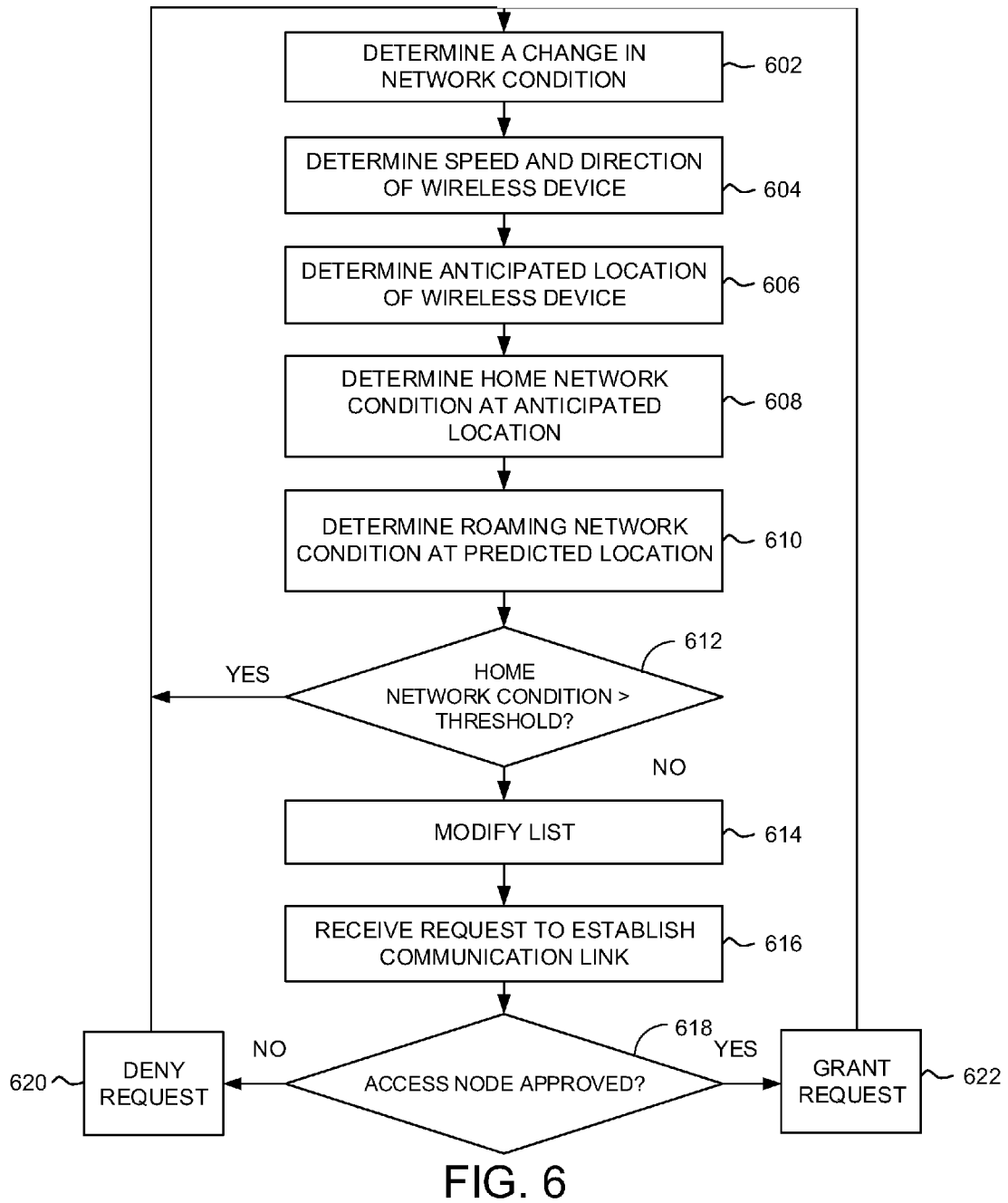
FIG. 6 illustrates another exemplary method of communicating with a wireless device in a wireless communication system.

FIG. 6 illustrates a flow chart of an exemplary method for operating a wireless communication system. The method will be discussed with reference to exemplary communication system 300 illustrated in FIG. 3 and exemplary communication system 500 illustrated in FIG. 5. However, the method can be implemented with any suitable communication system. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

In an embodiment, a communication system can proactively address anticipated network coverage gaps and/or network capacity issues by dynamically modifying a list indicative of approved access nodes of a home network and/or a roaming network in real-time. The list indicative of approved access nodes can be modified based on a location of wireless device.

A first network (e.g. the home network) can monitor at least one network condition of the home network and/or a roaming network. Various network conditions can be monitored. For example, policy node 318 can monitor network capacity based on network congestion, throughput, number of users, type of applications, and/or amount of information transmitted and received. Network capacity can be determined using various methods such as monitoring data transmissions, quality of service indicators, etc. Measurements can be based on the rate at which data is transmitted such as bits per second, data packets per second, and/or data packets per time slot. The data can be measured through the entire network and/or a predetermined area of the network.

Network coverage of each access node can be based on various communication link characteristics and can be determined using various factors such as received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR). In addition, environmental factors that can influence access node signal coverage can also be considered such as time of day, weather, season, etc.

At 602, the home network can determine a change in at least one network condition based on a location of a wireless device. For example, the wireless device 302 can send a request to establish a PTT communication link over the communication link and an accounting message can be send to the home network. For example, an Accounting Start message can be sent from authentication node 308 to authentication node 312. Alternatively, the Accounting Start message can be sent to home network node 414 from access node 404. The home network can determine whether a change in at least one network condition is detected within a predetermined area of the wireless device 302. For example, the policy node 318 can monitor the status of network capacity and/or network coverage of a home network and/or a roaming network.

When a change in the at least one network condition is determined at 602, the home network can determine a speed and direction of the wireless device at 604. The speed and direction can be determined in various ways. For example, the policy node 318 or home network node 514 can determine speed and direction based on accounting messages sent when a request to establish a PTT communication session is initiated. Alternatively or in addition to the accounting messages, policy node 318 or network node 514 can use one of more of the following to determine speed and direction of the wireless device: round-trip delay time, triangulation, information related to a global position system.

In an embodiment, direction and speed can be determined based on handoff intervals between access nodes. The handoff intervals can be based on the model of the wireless device. The device model information can be resolved through the network access identifier included in the accounting message and stored at a network node such as a provisioning network node 314. As illustrated in FIG. 5, data session handoff intervals between access nodes can be determined based on each accounting message received from wireless device 502 as it moves from access node 504 to 506 to 508 to 510 to 512. Any number of data session handoff intervals greater than two can be used to determine a predicted location and speed of the wireless device 502.

At 606, an anticipated location of a wireless device can be determined. Speed and direction information of the wireless device can be used to determine the anticipated location. For example, policy node 318 or home network node 514 can monitor the accounting messages to predict the future location of wireless devices 302, 502, respectively. In addition, the policy node 318 or home network node 514 can monitor the accounting messages to determine whether a change in network capacity and/or coverage can be anticipated.

After the anticipated wireless device location is determined, at least one network condition such as the network coverage and capacity of access nodes of the home network within a predetermined area of the predicted location can be determined at 608 and at least one network condition such as the network coverage and capacity of access nodes of the roaming network within a predetermined area of the predicted location can be determined at 610. Network capacity and network coverage of access nodes in each network can be determined in various ways. For example, network capacity can be based on network congestion, number of users, type of applications, amount of information transmitted and received, etc. Network capacity can be determined using various methods such as monitoring data transmissions, quality of service indicators, etc. Network coverage of each access node can be based on various communication link characteristics and can be determined using various factors such as received signal strength indication (RSSI), a throughput value of the access node, a signal-to-noise ratio (SNR) value, a carrier to noise ratio (CNR) value a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR). In addition, environmental factors that can influence access node signal coverage can also be considered such as time of day, weather, season, etc.

The at least one network condition of the home network and the at least one network condition of the roaming network can be compared to a threshold at 612 to determine whether to modify a management list indicative of approved access nodes. The threshold can be a single value or a range of values and can reflect various factors such as which network would provide a user a higher quality experience, which network would provide the least amount of undesirable interruptions in service, and/or which network would minimize expenditures for network use. For example, the threshold can be a predetermined value or range of values, or the threshold can be dynamically determined based on network capacity and/or coverage values of the home network and/or roaming network.

When the home network condition is greater than the threshold, the home network can continue to monitor the at least one network condition to determine a change in the network condition at 602. When the home network condition is less than the threshold, the management list can be modified at 614. For example, the management list can be modified to indicate that additional access nodes are now approved or the management list can be modified to indicate that access nodes that were previously approved are no longer approved access nodes to establish a PTT communication session.

At 616, the home network can receive a request from the wireless device to initiate a PTT communication session and the network can determine whether the access node is an approved access node at 618. For example, policy node 318 or network node 514 can compare access node identification information to the management list to determine whether the access node is an approved access node.

When the access node is an approved access node, the home network sends a message granting the request to initiate a PTT communication session at 622. When the access node is not an approved access node, the home network sends a message denying the request to initiate a PTT communication session at 620. In addition, the home network can send a message indicating an alternative access node in which the wireless device can successfully establish a PTT communication session.

Figure 7:
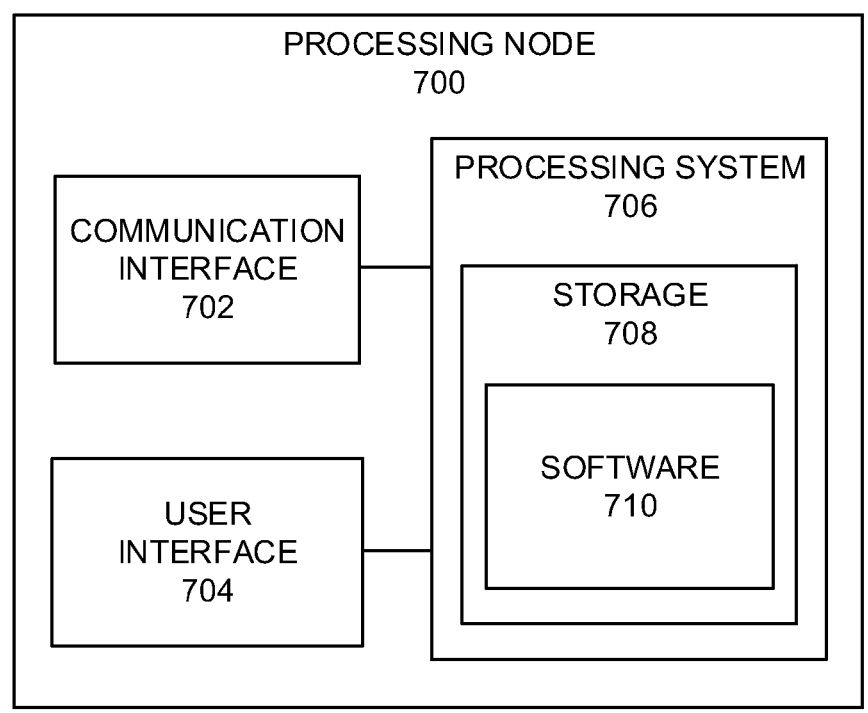
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 is capable of monitoring communications in a communication network. Processing system 706 includes storage 708, which can comprise a disk drive, flash drive, memory circuitry, or other memory device. Storage 708 can store software 710 which is used in the operation of the processing node 700. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access nodes 104, 106, 304, 306, 504, 506, 508, 510, 512, network nodes 108, 110, 514, 516, authentication nodes 308, 312, provisioning node 314, management node 316, policy node 318, PTT authentication node 320, and dynamic management node 322. Processing node 700 can also be an adjunct or component of a network element, such as an element of access nodes 104, 106, 304, 306, 504, 506, 508, 510, 512, network nodes 108, 110, 514, 516, authentication nodes 308, 312, provisioning node 314, management node 316, policy node 318, PTT authentication node 320, and dynamic management node 322. Processing node 700 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
   receiving, from a wireless device, a request to establish a data communication session with an access node of a roaming network at a network node of a first network, wherein the request is received at the roaming network and transmitted to the network node of the first network;
   determining an approved status of the access node based on an access node identifier transmitted by the wireless device in the request to establish the data communication session, wherein the wireless device is configured to establish the data communication session over the roaming network when the access node of the roaming network has an approved status;
   determining a network condition of the first network and the roaming network based on a plurality of access nodes within a predetermined distance of a location of the wireless device;
   comparing the determined network condition of the first network to a threshold;
   updating the approved status of the access node to a denied status when the determined network condition of the first network exceeds the threshold; and
   denying the request to establish the data communication session over the roaming network and transmitting an identity of an alternate approved access node for establishing the data communication session with to the wireless device.

2. The method of claim 1, wherein the threshold is based on a network condition of the roaming network.

3. The method of claim 1, wherein the network condition comprises at least one of network capacity of the plurality of access nodes of the first network within the predetermined distance of the location of the wireless device and RF coverage of each access node of the first network within the predetermined distance of the wireless device.

4. The method of claim 1, wherein the request from the wireless device comprises an accounting message.

5. The method of claim 1, wherein the first network is associated with a first network operator and the roaming network is associated with a second network operator.

6. The method of claim 1, wherein the data communication session is a push-to-talk dispatch communication session.

7. The method of claim 1, wherein the network node initiates determining the location of the wireless device when the access node of the roaming network is not an approved access node.

8. A method of operating a wireless communication system comprising:
- determining at a network node of a first network a change in a network condition of the first network;
- determining an anticipated network condition based on the change in the network condition;
- comparing the anticipated coverage condition of the first network to a threshold; and
- modifying a denied status of an access node of a roaming network when the anticipated coverage condition of the first network exceeds the threshold, wherein modifying the denied status comprises:
- determining a second network condition of the roaming network within a predetermined area;
- comparing the network condition of the first network within the predetermined area of a predicted location to the second network condition of the roaming network within the predetermined area; and
- modifying the denied status of the access node of the roaming network when the network condition of the first network is less than the second network condition of the roaming network.

9. The method of claim 8, wherein the network condition comprises at least one of RF coverage of an access node, network congestion, network throughput, network capacity, and hardware outages.

10. The method of claim 8, wherein determining the anticipated network condition comprises:
- receiving a request from a wireless device to initiate a data communication session;
- determining a speed at which the wireless device is traveling based on the request;
- determining the predicted location of the wireless device based on the speed determined; and
- determining the network condition of the first network within the predetermined area of the predicted location.

11. The method of claim 8, further comprising maintaining at the network node of the first network a list indicative of access nodes of the first network and access nodes of the roaming network that are approved to establish a data communication session with a wireless device associated with the first network.

12. The method of claim 8, wherein a data communication session is a push-to-talk dispatch communication session.

13. A system of operating a wireless communication system comprising:
- a processing node of a first network configured to
  - receive, from a wireless device, a request to establish a data communication session with an access node of a roaming network, wherein the request is received at the roaming network and transmitted to the processing node of the first network;
  - determine an approved status of the access node based on an access node identifier transmitted by the wireless device in the request to establish the data communication session, wherein the wireless device is configured to establish the data communication session over the roaming network when the access node of the roaming network has an approved status;
  - determine a network condition of the first network and the roaming network based on a plurality of access nodes within a predetermined area of a location of the wireless device;
  - compare the determined network condition of the first network to a threshold; and
  - deny the request to establish the data communication session over the roaming network and transmit an identity of an alternate approved access node for establishing the data communication session to the wireless device.

14. The system of claim 13, wherein the network condition comprises at least one of RF coverage of each access node of the first network within the predetermined area of the location of the wireless device and network capacity of the first network within the predetermined area of the location of the wireless device.

15. The system of claim 13, wherein the processing node is further configured to update the status of the access node of the roaming network to an approved status.

16. The system of claim 13, wherein the data communication session is a push-to-talk dispatch communication session.

* * * * *